(12) United States Patent
Matsumoto et al.

(10) Patent No.: US 6,897,935 B2
(45) Date of Patent: May 24, 2005

(54) LIQUID CRYSTAL DISPLAY DEVICE AND METHOD FOR MANUFACTURING SAME AND COLOR FILTER SUBSTRATE

(75) Inventors: Kimikazu Matsumoto, Tokyo (JP); Makoto Watanabe, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 126 days.

(21) Appl. No.: 09/986,109

(22) Filed: Nov. 7, 2001

(65) Prior Publication Data

US 2002/0054267 A1 May 9, 2002

(30) Foreign Application Priority Data

Nov. 9, 2000 (JP) ........................................ 2000-342163

(51) Int. Cl.[7] ............................................. G02F 1/1339
(52) U.S. Cl. ......................... 349/157; 349/155; 349/156
(58) Field of Search .................................. 349/155–157

(56) References Cited

U.S. PATENT DOCUMENTS

| | | | | |
|---|---|---|---|---|
| 5,282,069 A | * | 1/1994 | Sato ............................ 349/49 |
| 5,907,380 A | * | 5/1999 | Lien ........................... 349/141 |
| 5,986,729 A | * | 11/1999 | Yamanaka et al. ............. 349/79 |
| 6,064,461 A | * | 5/2000 | Nishida ....................... 349/155 |
| 6,317,188 B1 | * | 11/2001 | Shibahara .................... 349/155 |
| 6,330,048 B1 | * | 12/2001 | Shiomi et al. ................ 349/155 |
| 6,344,889 B1 | * | 2/2002 | Hasegawa et al. ........... 349/129 |
| 6,414,733 B1 | * | 7/2002 | Ishikawa et al. ............. 349/110 |
| 6,441,880 B1 | * | 8/2002 | Utsumi et al. ................ 349/155 |
| 6,504,592 B1 | * | 1/2003 | Takatori et al. .............. 349/129 |
| 6,522,379 B1 | * | 2/2003 | Ishihara et al. .............. 349/139 |
| 2001/0026347 A1 | * | 10/2001 | Sawasaki et al. ............ 349/156 |
| 2001/0052959 A1 | * | 12/2001 | Tamatani et al. ............ 349/153 |
| 2003/0206264 A1 | * | 11/2003 | Yoshimura et al. .......... 349/155 |
| 2004/0007748 A1 | * | 1/2004 | Sakama et al. .............. 257/410 |

FOREIGN PATENT DOCUMENTS

| | | | |
|---|---|---|---|
| JP | 60-182414 | | 9/1985 |
| JP | 05-19267 | | 1/1993 |
| JP | 06-202140 | | 7/1994 |
| JP | 10-48621 | | 2/1998 |
| JP | 10-104637 | * | 4/1998 |
| JP | 10-133191 | * | 5/1998 |
| JP | 10-186374 | * | 7/1998 |
| JP | 11-344700 | | 12/1999 |
| JP | 2000-305089 | * | 11/2000 |
| JP | 2001-117103 | * | 4/2001 |
| JP | 2001-174825 | * | 6/2001 |
| KR | 1999-0062433 | | 7/1999 |

OTHER PUBLICATIONS

Korean Office Action dated Oct. 30, 2003 with Japanese Translation and Partial English Translation.
Japanese Office Action dated Feb. 4, 2003 with partial translation.

* cited by examiner

*Primary Examiner*—Nathan J. Flynn
*Assistant Examiner*—Ahmed N. Sefer
(74) *Attorney, Agent, or Firm*—McGinn & Gibb, PLLC

(57) ABSTRACT

A liquid crystal display device capable of canceling out effects of signal charges, even when a columnar spacer bears signal charges, and preventing disturbance in a transverse electric field, includes pairs of columnar spacers that are disposed in two unit pixels adjacent to each other in a row direction or in a column direction. Each pair of columnar spacers is spaced from all other pairs of columnar spacers by at least two pixels of a row or a column.

20 Claims, 14 Drawing Sheets

When column density is 1/2 and liquid crystal is driven by dot reverse driving method.

FIG.7

When column density is 1/2 and liquid crystal is driven by dot reverse driving method.

FIG.8

When column density is 1/2 and liquid crystal is driven by gate line driving method.

FIG.9

When column density is 1/3 and liquid crystal is driven by dot reverse driving method.

FIG.10

*When column density is 1/4 and liquid crystal is driven by dot reverse driving method.*

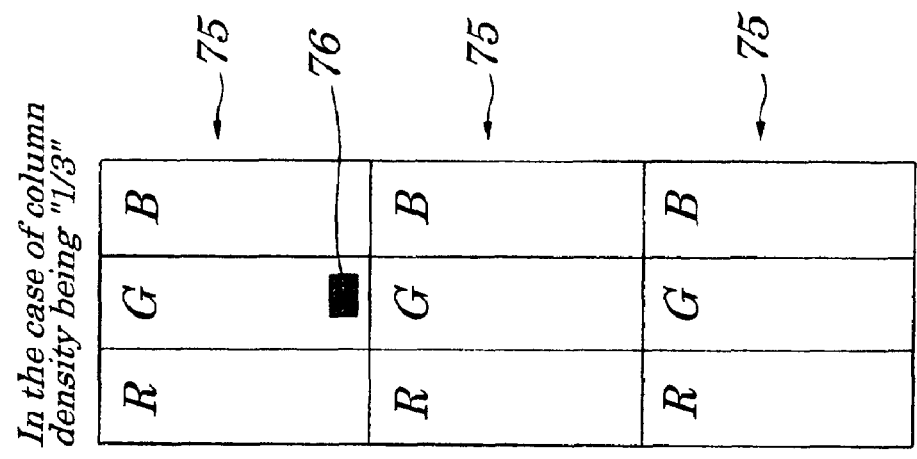
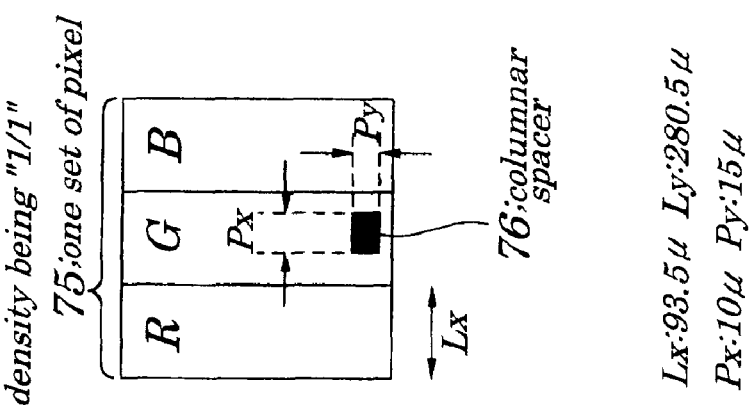
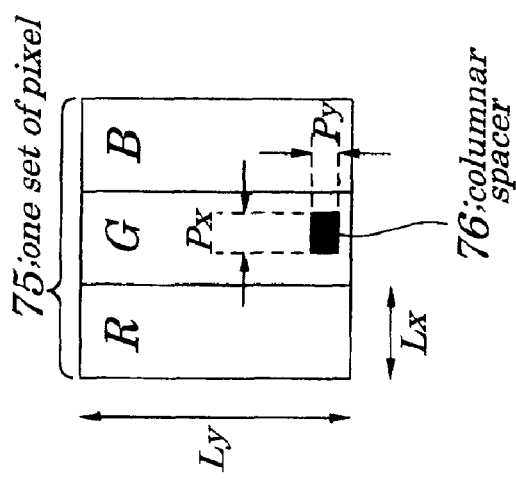

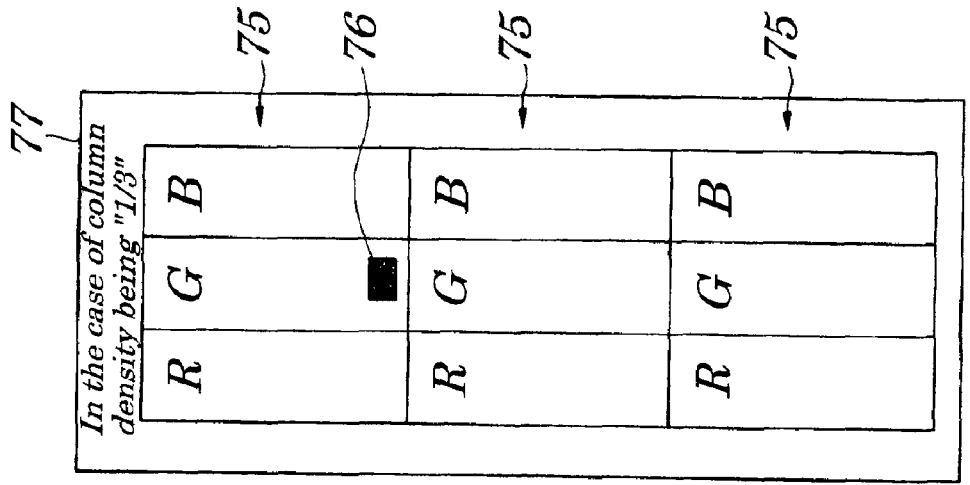
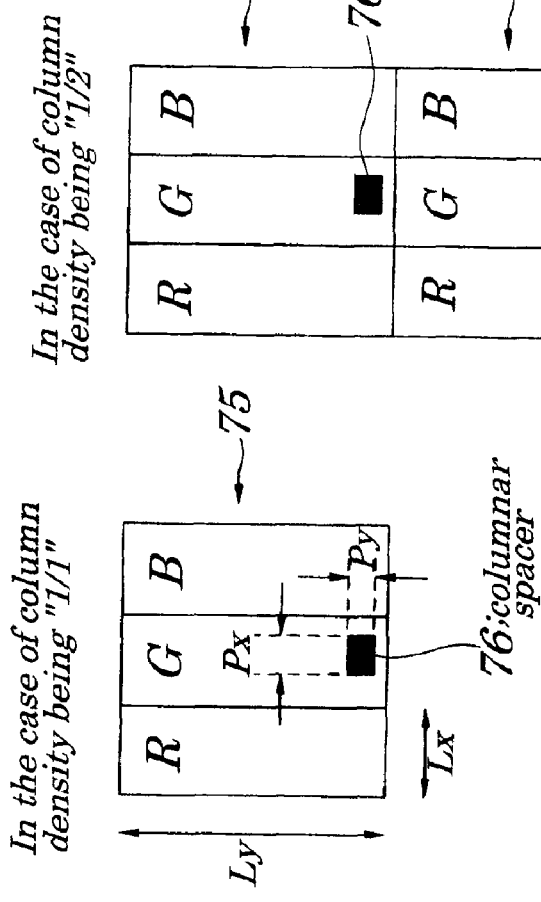
FIG.14A (PRIOR ART)  FIG.14B (PRIOR ART)  FIG.14C (PRIOR ART)

LIQUID CRYSTAL DISPLAY DEVICE AND METHOD FOR MANUFACTURING SAME AND COLOR FILTER SUBSTRATE

The present application claims priority of Japanese Patent Application No. 2000-342163 filed on Nov. 9, 2000, which is hereby incorporated by reference.

BACKGROUND OF THE INVENTION

1. Field of the Invention

The present invention relates to a liquid crystal display device and a method for manufacturing the liquid crystal display device and a CF (Color Filter) subtrate and more particularly to the liquid crystal display device in which a columnar spacer used to secure a cell gap between the CF substrate on which a colored layer is formed and a TFT (Thin Film Transistor) substrate on which the TFTs are formed, and to the method for manufacturing the liquid crystal display device and the CF substrate.

2. Description of the Related Art

The liquid crystal display device is widely used as a display device of various kinds of information devices or a like. In general the liquid crystal display device is so configured that a liquid crystal is put into a cell gap, in a hermetically sealed manner, between a CF substrate on which a colored layer having a plurality of one set of pixels made up of three kinds of unit pixels including a unit pixel for a red (R) color, a unit pixel for a green (G) color, and a unit pixel for a blue (B) color is formed; and a TFT substrate on which TFTs are adapted to operate as switching elements is formed on a face being opposite to the colored layer. Such the liquid crystal display device is roughly classified into two types, one being a TN (Twisted Nematic)—type liquid crystal display device and another being an IPS (In-Plane Switching)—type liquid crystal display device, depending on its display method.

FIG. 17 is a cross-sectional view schematically showing configurations of a conventional TN-type liquid crystal display device. As shown in FIG. 17, a liquid crystal 71 (liquid crystal molecule) is put into a cell gap 70, in a hermetically sealed manner between, between a TFT substrate 51 and a CF substrate 61. Moreover, the TFT substrate 51 includes a first transparent substrate 52 made up of glass or a like, a first polarizer 53 formed on a rear of the first transparent substrate 52, a pixel electrode 54 formed on a surface of the first transparent substrate 52, an interlayer dielectric 55 formed in a manner that it covers the pixel electrode 54, a drain wiring 56 formed on the interlayer dielectric 55, a passivation film 57 formed in a manner that it covers the drain wiring 56, and a first oriented film 58 formed on the passivation film 57.

The CF substrate 61 includes a second transparent substrate 62 made up of glass or a like, a second polarizer 63 formed on a rear of the second transparent substrate 62, a common electrode 64 formed on a surface of the second transparent substrate 62 and a BM (Black Matrix) layer 65 formed on the surface of the second transparent substrate 62, a colored layer 66 covering the common electrode 64 and the BM layer 65, an OC (Over Coat) layer 67 covering the BM layer 65 and the colored layer 66, and a second oriented film 68 formed on the OC layer 67.

In the TN-type liquid crystal display device described above, by applying a driving voltage between the pixel electrode 54 of the TFT substrate 51 and the common electrode 64 of the CF substrate 61, an electric field in a longitudinal direction relative to both the TFT substrate 51 and the CF substrate 61, is produced, as indicated by arrows 72.

FIG. 18 is a cross-sectional view schematically showing configurations of a conventional IPS-type liquid crystal display device. The configurations of the IPS-type liquid crystal display device shown in FIG. 18 differ from those in the TN-type liquid crystal display device described above in that the pixel electrode 54 and the common electrode 64 are formed on the first transparent substrate 52 in the TFT substrate 51 so that the pixel electrode 54 and the common electrode 64 are insulated from each other with the interlayer dielectric 55 being interposed between the pixel electrode 54 and the common electrode 64.

In such the IPS-type liquid crystal display device as described above, by applying a driving voltage between the pixel electrode 54 and the common electrode 64 formed on the TFT substrate 51, an electric field in a horizontal direction relative to the TFT substrate 51, is produced, as indicated by arrows 73. By configuring above, in the case of the IPS-type liquid crystal display device, a direction of the liquid crystal molecule 71 along the surface of the TFT substrate 51 is determined, which can provide a wider viewing angle compared with the case of the TN-type liquid crystal display device. Therefore, the IPS-type liquid crystal display device (hereinafter, referred to simply as an LCD) is mainly and increasingly used.

In fabrication of the LCD, in order to secure the cell gap 70, into which the liquid crystal 71 is put in a hermetically sealed manner, between the CF substrate 61 and TFT substrate 51, a columnar spacer (not shown) made up of an insulating material is disposed between the CF substrate 61 and the TFT substrate 51. Though the liquid crystal 71 is put in a hermetically sealed manner between the CF substrate 61 and the TFT substrate 51, the liquid crystal 71 expands or shrinks depending on a change in ambient temperatures. Therefore, the columnar spacer has to be disposed SO that a liquid crystal panel is formed in a manner that it is somewhat crushed at ordinary temperatures. Moreover, the columnar spacer has to be disposed so that the cell gap 70 is formed uniformly within faces being opposite to each other between both the CF substrate 61 and TFT substrate 51. However, there is a "trade-off" between these two needs. To satisfy these two needs simultaneously, a columnar area ratio CA defined as below has to be set within a range, as a precondition. The columnar area ratio CA is defined as follows:

$$\text{Columnar area ratio } CA=(Px)\cdot(Py)/(Lx)\cdot(Ly)$$

where Px denotes a horizontal length of the columnar spacer, Py denotes a longitudinal length of the columnar spacer, Lx denotes a horizontal length of each of the unit pixels including the unit pixel for the R color, unit pixel of the G color, and unit pixel for the B color, and Ly denotes a longitudinal length of each of the unit pixels including the R, G, and B color pixels. That is, the columnar area ratio CA is defined as a ratio of a cross sectional area of the columnar spacer to an area of each unit pixel.

The applicant of the present invention has already found that the above two needs can be approximately satisfied by disposing the columnar spacer so that the above columnar area ratio CA is set within a range of 0.05% to 0.15% (refer to Japanese Laid-open Patent Application No. 2001-117103, published on Apr. 27, 2001 after the filing date of Japanese Patent Application No. 2000-342163 of which the present application claims priority)

On the other hand, to avoid reduction in an effective area of the liquid crystal panel, it is desirous that the number of the columnar spacers is small and its sizes, that is, its horizontal length Px and its longitudinal length Py are small. Size of the columnar spacer is determined depending on fabrication accuracy of photolithography. If the size is too small, it is unstable in terms of strength. Therefore, both the horizontal length Px and the longitudinal length Py are set at approximately 8 μm or more. Moreover, the columnar spacer is disposed on a gate electrode (gate bus line) of the TFT which can provide a uniformly wide and flat place on the TFT substrate 51 and the horizontal length Px and longitudinal length Py have to be set so that they are smaller than a width P(G) (approximately 13 μm) of the gate electrode (not shown). Furthermore, when the horizontal length Px and longitudinal length Py of the columnar spacer have to be determined, it is necessary to take into consideration a shift "n" (approximately 3 μm or more) in superposition of the TFT substrate 51 on the CF substrate 61.

Also, when the columnar spacer is disposed, consideration has to be given to a column density. The column density is defined as a ratio of the number of columnar spacers to one set of pixels 75 made up of three kinds of unit pixels for R, G, and B colors. For example, as shown in FIG. 13A, when one columnar spacer 76 is disposed at any one (for example, the unit pixel for G color) of the unit pixels contained in one set of pixels 75, the column density is defined as "1/1". Moreover, as shown in FIG. 13B, when one columnar spacer 76 is arranged in two sets of the pixel 75, the column density is defined as "1/2". As shown in FIG. 13C, when one columnar spacer 76 is arranged in three sets of the pixel 75, the column density is defined as "1/3". This means that, when the configuration shown in FIG. 13A having the column density being "1/1" is considered as a standard configuration, the columnar spacer 76 in the configuration shown in FIG. 13B having the column density being "1/2" is thinned out, that is, the number of the columnar spacers 76 is reduced by a half and in the configuration shown in FIG. 13C having the column density being "1/3", the number of the column spacers 76 is reduced by one third.

If the horizontal length Lx and longitudinal length Ly of each of the unit pixels for the R, G, and B colors, and the horizontal length Px and longitudinal length Py of the columnar spacer 76 in FIGS. 13A to 13C are set at values as shown in a lower part of FIG. 13A, the columnar area ratio CA can be calculated by using the expression shown above and the following values can be obtained.

① In the case of the column density being "1/1"->Columnar area ratio≈0.19%
② In the case of the column density being "1/2"->Columnar area ratio≈0.095%
③ In the case of the column density being "1/3"->Columnar area ratio≈0.063%

Therefore, when compared with the columnar area ratio CA used as the precondition described above, the values obtained in the above cases of ② and ③ are within the optimum range (0.05% to 0.15%). However, since a value being close to a mean value of the optimum range is preferable in actual operations, it is desirous that the columnar spacer 76 is disposed so that the configuration having the column density being "1/2" (the case of ②) boxed by a frame 77 shown in FIG. 13B can be provided.

FIGS. 14A, 14B, and 14C are also diagrams explaining the column density of the columnar spacer 76 in which the horizontal length Lx and longitudinal length Ly of each of the unit pixels remain the same as those in FIGS. 13A to 13C and the horizontal length of Px and longitudinal length Py of the columnar spacer 76 are different from those in FIGS. 13A to 13C.

The columnar area ratio CA of each of the cases is as follows.

① In the case of the column density being "1/1"->Columnar area ratio≈0.285%
② In the case of the column density being "1/2"->Columnar area ratio≈0.142%
③ In the case of the column density being "1/3"->Columnar area ratio≈0.094%

Therefore, in the example, values obtained in the cases ② and ③ are within the optimum range of the columnar area ratio CA used as the precondition. However, for the same reason as above, it is desirous that the columnar spacer 76 is disposed so that the configuration having the column density being "1/3" (the case of ③) boxed by a frame 77 shown in FIG. 14C can be provided.

As described above, by changing the horizontal length Px and longitudinal length Py of the columnar spacer 76, the column density that can satisfy the precondition is changeable. By changing the horizontal length Lx and longitudinal length Ly of each of the unit pixels, the column density that can satisfy the precondition is also changeable. However, when the horizontal length Px and longitudinal length Py of the columnar spacer 76 are to be changed, the change must be within the range of constraints described above.

FIG. 15 is a top view schematically showing configurations of the conventional LCD in which the columnar spacer 76 is disposed so that the columnar area ratio CA is set within the optimum range used as the precondition and the column density becomes "1/2". As shown in FIG. 15, the conventional LCD is so configured that two columnar spacers 76 are arranged in four sets of the pixel 75 indicated by broken lines (two sets along a row direction and two sets along a column direction), that is, one columnar spacer 76 is arranged in two sets of the pixel 75. Here, the columnar spacer 76 is disposed in, for example, the same unit pixels for G color and also in every other set of pixels 75 in a staggered manner. Thus, by disposing the columnar spacer 76 so that the columnar area ratio CA can satisfy the precondition and the column density becomes "1/2", an elastic compositional deformation of the columnar spacer 76 is well balanced, which enables the columnar spacer 76 to be adaptable to changes in a thickness of the cell gap 70 caused by ambient temperatures.

However, the conventional LCD has a problem. That is, in the conventional LCD, since the columnar spacer 76 is arranged in the unit pixels for a same color in every other set of pixels 75, when the liquid crystal 71 is driven, all the columnar spacers 76 bear signal charges being the same in polarity, which causes disturbance in a transverse electric field caused by the signal charge being the same in polarity.

This problem in the conventional LCD will be explained below by referring to FIG. 16. FIG. 16 is a diagram explaining a method for driving the conventional LCD. The liquid crystal making up the LCD has a property that it is crushed by continued application of a voltage being the same in polarity (positive or negative). To avoid this, the liquid crystal 71 (not shown in FIG. 16) in the conventional LCD is driven by a dot reverse driving method in which a voltage being opposite in polarity is always applied alternately to the same unit pixel. Therefore, as shown in FIG. 16, a positive signal charge or a negative signal charge is written alternately in every unit pixel being arranged along the row direction X and a negative signal charge or a positive signal charge is written alternately in every unit pixel being arranged along the column direction Y so that each of the unit pixels adjacent to each other bears the signal charge being opposite in polarity. The reason why the positive or negative voltage is applied alternately to the unit pixels being adjacent to each other is to prevent flicker in displaying.

If the columnar spacer 76 is disposed in the unit pixels for the same color, for example, the G and G color pixels, for every other set of pixels 75, as in the case of the conventional LCD shown in FIG. 15, since the signal charge being the same in polarity is always written in every other unit having the columnar spacer 76 being arranged in the column direction Y, the signal charge causes the columnar spacer 76 to be electrically charged. That is, the columnar spacer 76 disposed in the unit pixel "G" bears the electrical charge being the same in polarity (positive or negative). As a result, the traverse electrical field is disturbed by influence of the signal charge being the same in polarity. In FIG. 16, there is shown a range 78 in which the traverse field is disturbed and shows that the range extends to an entire region in the column direction Y in which the columnar spacer 76 is arranged. On the other hand, since there is no object to be charged in the unit pixel having no columnar spacer 76, no disturbance in the traverse field occurs.

In the case of the IPS-type LCD in particular, since a method is employed to decrease specific resistance of the liquid crystal 71 in order to inhibit image retention, when the columnar spacer 76 is electrically charged, the electric charge in the liquid crystal panel gathers and the local specific resistance of the liquid crystal 71 is changed. Therefore, in the conventional LCD whose liquid crystal 71 is driven by the dot reverse driving method, if the columnar spacer 76 is disposed so that it is charged only when the signal charge having one polarity is applied, only electric line of force of the pixel voltage having one polarity enters the columnar spacer 76 and, as a result, the specific resistance of the liquid crystal 71 existing near the columnar spacer 76 is changed, which causes a failure in displaying such as flicker even when the liquid crystal 71 of the LCD is driven by the dot reverse driving method.

SUMMARY OF THE INVENTION

In view of the above, it is an object of the present invention to provide an LCD which is capable of canceling out effects of signal charges even when a columnar spacer bears the signal charges and preventing disturbance in a traverse electric field, a method for manufacturing the LCD and a CF substrate.

According to a first aspect of the present invention, there is provided a liquid crystal display device including:

a columnar spacer being interposed between a CF substrate and a TFT substrate; and wherein a column density of the columnar spacer is smaller than 1 (one) and wherein the columnar spacer is disposed in two unit pixels being adjacent to each other and each bearing a signal charge being opposite in polarity.

In the foregoing, a preferable mode is one wherein a liquid crystal in the liquid crystal display device is driven by a gate line reverse driving method or a dot reverse driving method.

According to a second aspect of the present invention, there is provided a liquid crystal display device including:

a CF substrate on which a colored layer is formed so that unit pixels are arranged in a matrix form;

a TFT substrate on which TFTs are formed at a place being opposite to the colored layer;

a columnar spacer formed to secure a cell gap being disposed between the CF substrate and TFT substrate; and wherein a liquid crystal is put into the cell gap in a hermetically sealed manner and wherein a columnar area ratio being a ratio of a cross sectional area of the columnar spacer to an area of the unit pixel is set within a range of 0.05% to 0.15% and each columnar spacer making up a pair of the columnar spacers is disposed in each of two unit pixels being arranged in a matrix form and being adjacent to each other at an arbitrary place along a row direction or column direction.

In the foregoing, a preferable mode is one wherein the unit pixel is driven by a dot reverse driving method when the columnar spacers are arranged along the column direction and wherein the unit pixel is driven by a gate line reverse driving method when the columnar spacers are arranged along the row direction.

According to a third aspect of the present invention, there is provided a liquid crystal display device including:

a CF substrate on which a colored layer is formed so that sets of pixels each set being made up of three kinds of unit pixels including a unit pixel for a red (R) color, a unit pixel for a green (G) color, and a unit pixel for a blue (B) color are arranged in a matrix form;

a TFT substrate on which TFTs are formed at a place being opposite to the colored layer;

a columnar spacer formed to secure a cell gap being disposed between the CF substrate and TFT substrate; and wherein a liquid crystal is put into the cell gap in a hermetically sealed manner and wherein a columnar area ratio being a ratio of a cross sectional area of the columnar spacer to an area of each unit pixel is set within a range of 0.05% to 0.15% and the columnar spacer is disposed both in one unit pixel making up an arbitrary one set of pixels and in another unit pixel exhibiting a same color as exhibited by the unit pixel in another set of pixels being adjacent to the above one set of pixels along a column direction.

In the foregoing, a preferable mode is one wherein the unit pixel is driven by a dot reverse driving method.

According to a fourth aspect of the present invention, there is provided a liquid crystal display device including:

a CF substrate on which a colored layer is formed so that sets of pixels each being made up of three kinds of unit pixels including a unit pixel for a red (R) color, a unit pixel for a green (G) color, and a unit pixel for a blue (B) color are arranged in a matrix form;

a TFT substrate on which TFTs are formed at a place being opposite to the colored layer;

a columnar spacer formed to secure a cell gap being disposed between the CF substrate and the TFT substrate; and wherein a liquid crystal is put into the cell gap in a hermetically sealed manner and wherein a columnar area ratio being a ratio of a cross sectional area of the columnar spacer to an area of each unit pixel is set within a range of 0.05% to 0.15% and the columnar spacer is arranged both in one unit pixel making up an arbitrary one set of pixels and in another unit pixel being adjacent to the unit pixel along a row direction.

In the foregoing, a preferable mode is one wherein the unit pixel is driven by a gate line reverse driving method.

Also, a preferable mode is one wherein the columnar spacer is disposed on a gate electrode of the TFT formed on the TFT substrate.

Also, a preferable mode is one wherein a pixel electrode and a common electrode are formed on the TFT substrate in a manner that the pixel electrode and the common electrode are insulated from each other.

Also, a preferable mode is one wherein, when one columnar spacer is disposed in any one in one set of pixels made up of three kinds of unit pixels including the unit pixel for the R color, the unit pixel for the G color, and the unit pixel for the B color, a column density is defined as 1/1 and wherein the columnar spacer is arranged so as to lower the column density, even when a plurality of sets of pixels is disposed in a manner that the sets of pixels are adjacent to each other, by reducing the number of the columnar spacers within a range in which the columnar area ratio is satisfied.

Also, a preferable mode is one wherein the columnar spacer is disposed in a plurality of sets of pixels so that the column density becomes 1/2.

According to a fifth aspect of the present invention, there is provided a method for manufacturing a liquid crystal display device including a CF substrate on which a colored layer is formed so that unit pixels are arranged in a matrix form, a TFT substrate on which TFTs are formed at a place being opposite to the colored layer and a columnar spacer formed to secure a cell gap being disposed between the CF substrate and the TFT substrate wherein a liquid crystal is put into the cell gap in a hermetically sealed manner and, the method including:

a process of forming the TFT substrate by incorporating at least one TFT in a surface of a first transparent insulating substrate;

a process of forming the CF substrate by first forming at least one colored layer on a surface of a second transparent insulating substrate being opposite to the TFT and then by forming the columnar spacer on the colored layer; and a process of putting the liquid crystal into the cell gap secured by the columnar spacer disposed between the TFT substrate and the CF substrate, in the hermetically sealed manner.

In the foregoing, a preferable mode is one wherein the process of forming the CF substrate includes a process of first applying a photosensitive resin in a manner so as to cover the colored layer and then performing patterning on the photosensitive resin to form the columnar spacer.

According to a sixth aspect of the present invention, there is provided a CF substrate for being disposed opposite to a TFT substrate on which TFTs are formed, thereby forming a cell gap between the TFT substrate and the CF substrate, wherein a liquid crystal is put into the cell gap in a hermetically sealed manner, the CF substrate including:

a colored layer formed on a transparent substrate so that unit pixels are arranged in a matrix form; and a columnar spacer is formed on the colored layer.

In the foregoing, a preferable mode is one wherein the columnar spacer is made up of photosensitive resins.

With the above configurations, each columnar spacer making up a pair of columnar spacers is disposed in each of two unit pixels being arranged in a matrix manner and being adjacent to each other along a row direction or a column direction at an arbitrary place in a plurality of places where unit pixels are arranged and each columnar spacer making up the pair of the columnar spacers bears a charge being opposite in polarity and therefore effects by a signal charge can be cancelled out. Moreover, when the columnar spacer is incorporated into the CF substrate, lithography technology is employed and therefore easy formation of the columnar spacer is made possible. In configurations of the CF substrate, the columnar spacer is formed on the colored layer and therefore the columnar spacer can be disposed easily at an arbitrary place. As a result, even when the columnar spacer bears the signal charge, the effects by the signal charge can be cancelled out and a disturbance of a traverse electric field can be prevented.

BRIEF DESCRIPTION OF THE DRAWINGS

The above and other objects, advantages, and features of the present invention will be more apparent from the following description taken in conjunction with the accompanying drawings in which:

FIG. 7 is a top view schematically showing configurations of an LCD according to a second embodiment of the present invention;

FIG. 8 is a top view schematically showing configurations of an LCD according to a third embodiment of the present invention;

FIG. 9 is a top view schematically showing configurations of an LCD according to a fourth embodiment of the present invention;

FIG. 10 is a top view schematically showing configurations of an LCD according to a fifth embodiment of the present invention;

FIGS. 13A, 13B, and 13C are diagrams explaining column density of a columnar spacer employed in a conventional LCD;

FIG. 14A, 14B, and 14C are also diagrams explaining column density of a columnar spacer employed in another conventional LCD;

DETAILED DESCRIPTION OF THE PREFERRED EMBODIMENTS

Best modes of carrying out the present invention will be described in further detail using various embodiments with reference to the accompanying drawings.

In the embodiments, as described later in detail, a CF substrate and a TFT substrate are formed with columnar spacers being interposed between these two substrates in a manner that these two substrates face each other. A column density of the columnar spacer is set to be smaller than 1 (one). The columnar spacers in a pair are so arranged that they are adjacent to each other. Each columnar spacer making up the pair of the columnar spacers is disposed in each of two unit pixels being adjacent to each other, to each of which signals having polarity being opposite to each other are applied.

First Embodiment

Figure 1:
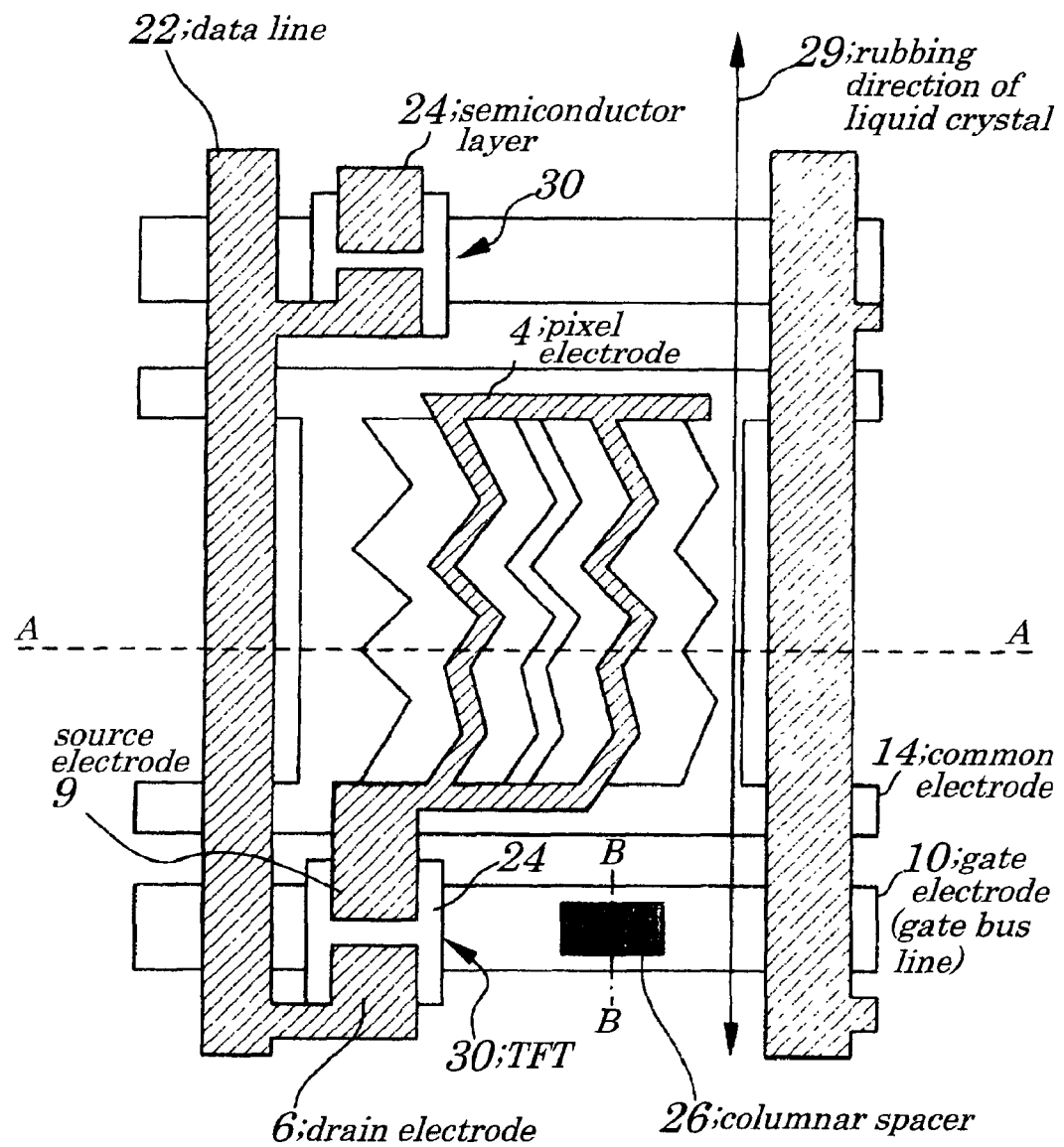
FIG. 1 is a top view showing configurations of an LCD according to a first embodiment of the present invention.
Figure 2:
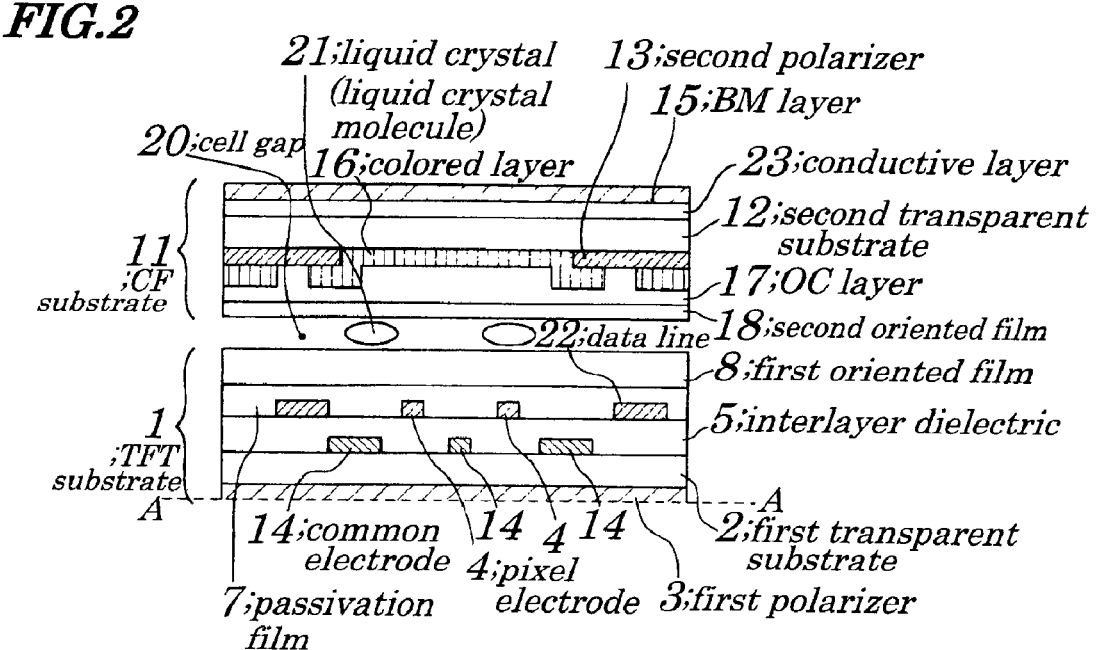
FIG. 2 is a cross-sectional view of the LCD of FIG. 1 taken along a line A—A.
Figure 3:
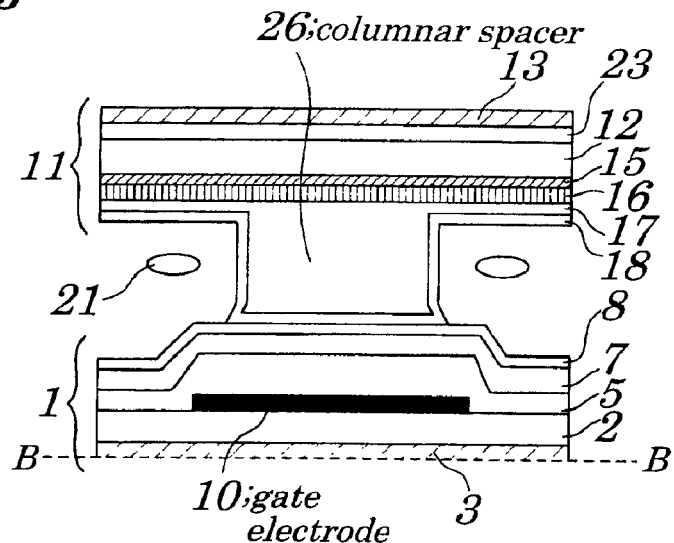
FIG. 3 is a cross-sectional view of the LCD of FIG. 1 taken along a line B—B.
Figure 4A:
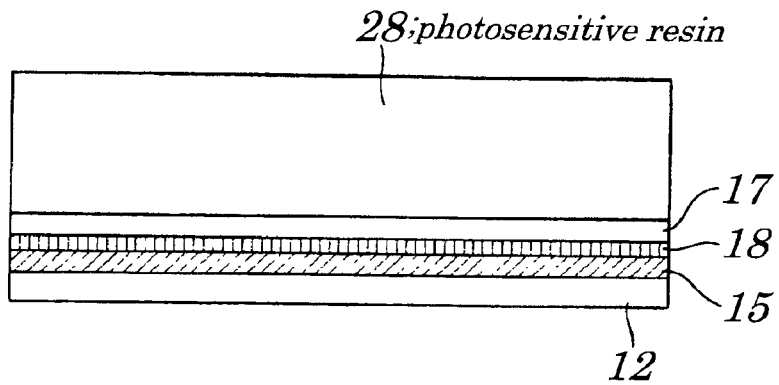
FIGS. 4A, 4B, and 4c are process diagrams illustrating a method of manufacturing a CF substrate making up main components of the LCD, in order of processes, according to the first embodiment of the present invention.
Figure 4B:
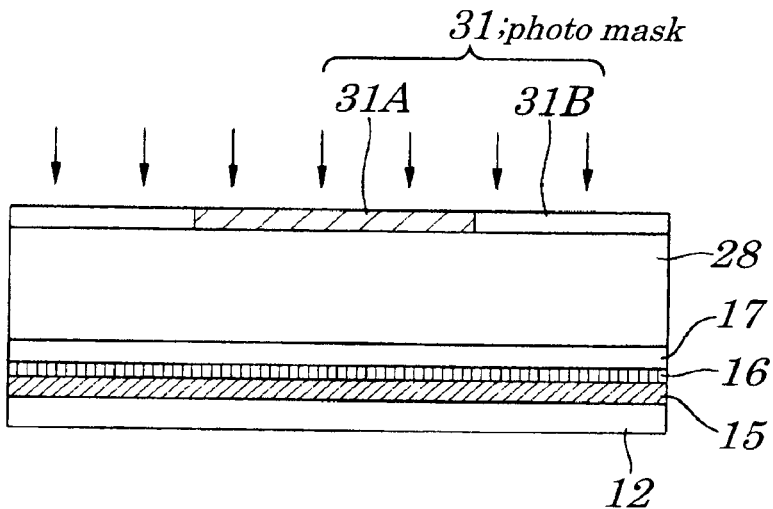
Figure 4C:
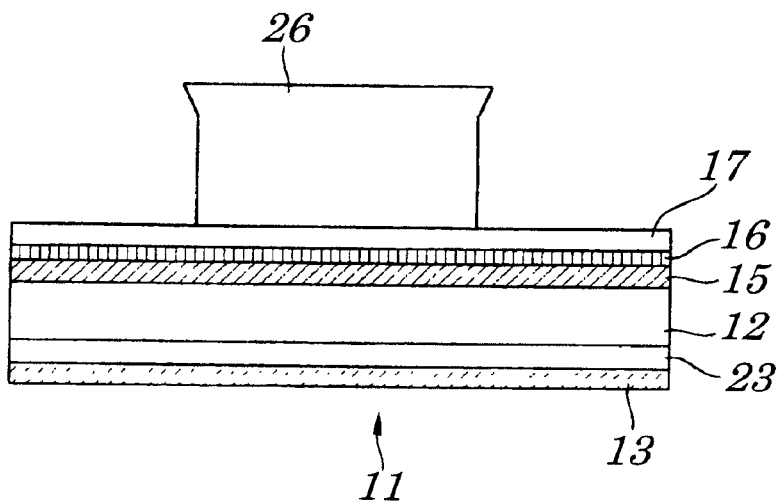

FIG. 1 is a top view showing configurations of an LCD according to a first embodiment of the present invention. FIG. 2 is a cross-sectional view of the LCD of FIG. 1 taken along a line A—A. FIG. 3 is a cross-sectional view of the LCD of FIG. 1 taken along a line B—B. FIGS. 4A to 4C are process diagrams illustrating main processes in a method for manufacturing the LCD according to the first embodiment.

As shown in FIG. 1 to FIG. 3, in the LCD of the embodiment of the present invention, a liquid crystal 21 (liquid crystal molecule) is put into a cell gap 20, in a hermetically sealed manner, between a TFT substrate 1 and a CF substrate 11. The TFT substrate 1 includes a first transparent substrate 2 made up of glass or a like, a first polarizer 3 formed on a rear of the first transparent substrate 2, a gate electrode (gate bus line) 10 formed on a part of a surface of the first transparent substrate 2, a common electrode 14 formed on an other portion of the surface of the first transparent substrate 2, hereby the gate electrode 10 and the common electrode 14 constituting a same layer, an interlayer dielectric 5 formed in a manner so as to cover both the common electrode 14 and the gate electrode 10, a pixel electrode 4 formed on the interlayer dielectric 5, a drain electrode 6 formed also on the interlayer dielectric 5, a data line 22 formed also on the interlayer dielectric 5, a passivation film 7 formed in a manner so as to cover the pixel electrode 4, drain electrode 6 and data line 22, and a first oriented film 8 formed on the passivation film 7.

Thus, in an IPS-type LCD, the pixel electrode 4 and the common electrode 14 are formed on the first transparent substrate 2 in the TFT substrate 1 in a manner that they are insulated from each other with the interlayer dielectric 5 being interposed between the pixel electrode 4 and the common electrode 14. A TFT 30 includes the drain electrode 6, a source electrode 9, gate the electrode 10, and a semiconductor layer 24. A rubbing direction of the liquid crystal 21 is indicated by a reference number 29.

The CF substrate 11 includes a second transparent substrate 12, a second polarizer 13 formed on a rear of the second transparent substrate 12 with a conductive layer 23 being interposed between the second transparent substrate 12 and the second polarizer 13, a BM layer 15 formed on a surface of the second transparent substrate 12, a colored layer 16 covering the BM layer 15, an OC layer 17 covering the BM layer 15 and colored layer 16, a columnar spacer 26 formed on a part of the OC layer 17, and a second oriented film 18 formed so as to cover the columnar spacer 26. The columnar spacer 26 is disposed on a surface of the gate electrode (gate bus line) 10 of the TFT 30. The surface of the gate electrode 10 has a uniformly wide and flat surface on the TFT substrate 1. The columnar spacer 26 is adapted to secure the cell gap 20. That is, the cell gap 20 in which the liquid crystal 21 is put in the hermetically sealed manner, exists in space being surrounded by the second oriented film 18 covering the columnar spacer 26 and the first oriented film 8, between the CF substrate 11 and the TFT substrate 1.

Next, the method for manufacturing the CF substrate 11 making up main components of the LCD will be described, in order of processes, by referring to FIGS. 4A to 4C.

As shown in FIG. 4A, first, on the surface of the second transparent substrate 12 made up of glass or a like are formed, in order, the BM layer 15, the colored layer 16 and the OC layer 17. Then, by using a photolithography method, a photosensitive resin 28 such as a positive resist is applied on all surfaces of the OC layer 17.

Next, as shown in FIG. 4B, after having covered the photosensitive resin 28 with a photo mask 31 having a light shielding portion 31A and a light transmitting portion 31B, exposure treatment (that is, radiation with ultraviolet rays UV) is performed. Then, as shown in FIG. 4C, by carrying out development treatment, patterning operations are performed on the photosensitive resin 28. As a result, a part of the photosensitive resin 28 is removed by the exposure to the ultraviolet rays UV applied through the light transmitting portion 31B of the photo mask 31 and the columnar spacer 26 is formed on the CF substrate 11. In the embodiment, the columnar spacer 26 is formed at a place corresponding to the gate electrode (gate bus line) 10 on the TFT substrate 1. The columnar spacer 26 acts so as to secure the cell gap 20, into which the liquid crystal 21 is to be put in the hermetically sealed manner, between the CF substrate 11 and the TFT substrate 1. The columnar spacer 26 is formed so as to have a height of 4 $\mu$m to 7 $\mu$m. Moreover, after the liquid crystal 21 has been put, in the hermetically sealed manner, into the cell gap 20 secured by the columnar spacer 26, a second polarizer 13 is formed on a rear of the CF substrate 11 with the conductive layer 23 interposed between the second polarizer 13 and the CF substrate 11.

Then, as shown in FIG, to FIG. 3, by using the TFT substrate 1 into which the TFT 30 fabricated in separate processes is incorporated, the liquid crystal 21 is put into the cell gap 20 secured by the columnar spacer 26 between the CF substrate 11 and the TFT substrate 1, in the hermetically sealed manner, and the LCD is now completed.

According to the manufacturing method described above, since the columnar spacer 26 is incorporated in the CF substrate 11 by using photolithography technology, easy formation of the columnar spacer 26 is made possible. Moreover, since the CF substrate 11 already having the columnar spacer 26 therewith can be obtained, the columnar spacer 26 can be disposed easily at an arbitrary place between the CF substrate 11 and the TFT substrate 1.

Figure 5:
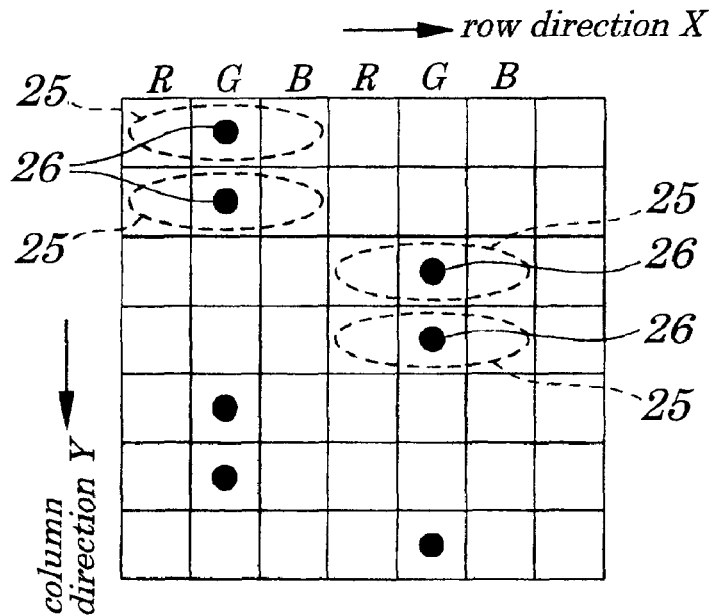
FIG. 5 is a top view schematically showing configurations of the LCD according to the first embodiment of the present invention.

In the LCD of the embodiment, as shown in FIG. 5, the columnar spacer 26 is disposed so that a columnar area ratio CA is set within an optimum range used as a precondition described above and a column density becomes "1/2". Moreover, each columnar spacer 26 making up a pair of the columnar spacers 26 is arranged in each of two unit pixels adjacent to each other in a column direction Y, for example, in a G and G color unit pixels, while the columnar spacer 26 is arranged in the unit pixel in every two unit pixels in a row direction X, for example, in the G color unit pixel, in a staggered manner. One set of pixels 25 is made up of three unit pixels including a unit pixel for an R color, a unit pixel for the G color and a unit pixel for a B color.

Figure 6:
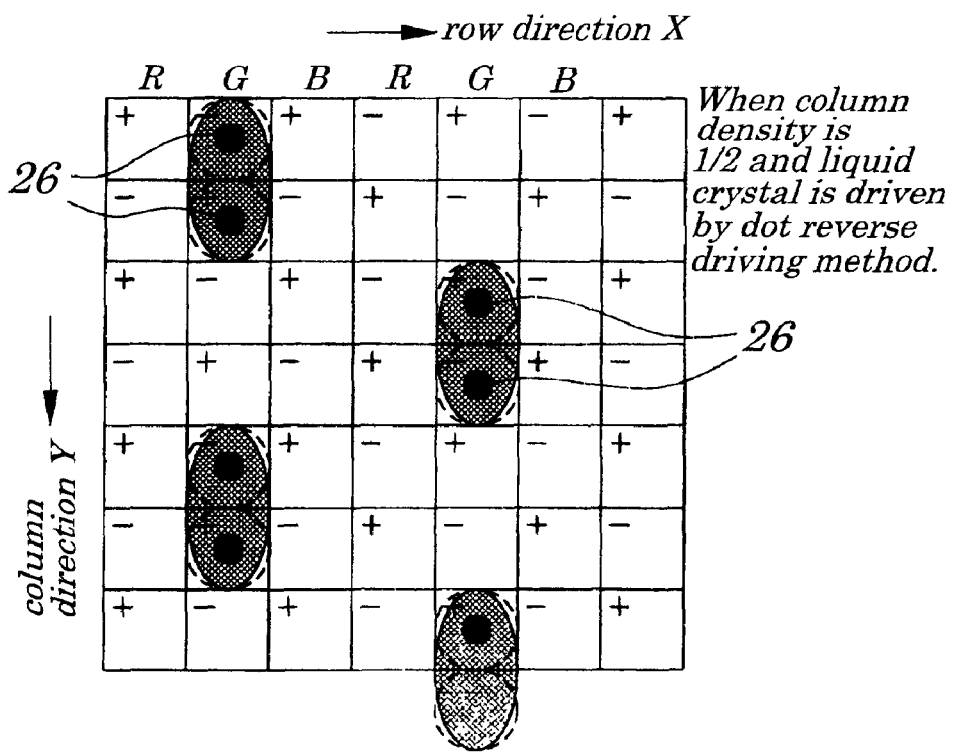
FIG. 6 is a diagram showing a method for driving the LCD according to the first embodiment of the present invention.

Next, a method for driving the LCD of the present invention will be explained by referring to FIG. 6. As shown in FIG. 6, a positive signal charge or a negative signal charge is written alternately in every unit pixel being arranged along the row direction X and a negative signal charge or a positive signal charge is written alternately in every unit pixel being arranged along the column direction Y so that each of the unit pixels adjacent to each other bears the signal charge being opposite in polarity. Therefore, signal charges each being opposite in polarity are always written in each of the two unit pixels being adjacent to each other in the column direction Y, in each of which each columnar spacer 26 making up the pair of the columnar spacers 26 are disposed. As a result, even when the pair of the columnar spacers 26 is electrically charged, since each columnar spacer 26 making up the pair of the columnar spacers 26 bears the signal charge being opposite in polarity, each columnar spacer 26 making up the pair of the columnar spacers 26 can cancel out effects by the signal charge. Thus, even when the columnar spacer 26 is charged, no disturbance in a traverse electric field occurs, thereby preventing occurrence of a failure in displaying such as flicker.

As described above, according to the LCD of the first embodiment of the present invention, since the columnar spacer 26 is so disposed that the columnar area ratio CA is set within the optimum range used as the precondition, that each columnar spacer 26 making up the pair of columnar spacers 26 is arranged in each of two unit pixels being adjacent to each other, in order, in the column direction Y, for example, in the G and G color unit pixels, while it is arranged in the unit pixel in every two unit pixels and in a staggered manner in a row direction X, for example, in the G color unit pixel, even when the pair of the columnar spacers 26 is electrically charged, each columnar spacer 26 making up the pair of the columnar spacers 26 bears the signal charge being opposite in polarity and, therefore, the two columnar spacers 26 making up the pair of the columnar spacers 26 can cancel out the effects by the signal charge of each other.

Moreover, according to the method of manufacturing the LCD, the columnar spacer 26 is incorporated in the CF substrate 11 by performing photolithographic operations, the columnar spacer 26 can be easily formed.

Therefore, even if the columnar spacer 26 is electrically charged, the effects by the signal charges can be cancelled out and, as a result, the disturbance in the traverse electric field can be prevented.

Second Embodiment

FIG. 7 is a top view schematically showing configurations of an LCD according to a second embodiment of the present invention. Configurations in the second embodiment differ greatly from those in the first embodiment in that each columnar spacer 26 making up a pair of the columnar spacers 26 is arranged in each of two unit pixels being adjacent to each other in a row direction X.

That is, in the LCD of the second embodiment, as shown in FIG. 7, the columnar spacer 26 is disposed so that a columnar area ratio CA is set within an optimum range used as a precondition described above and a column density becomes "1/2". Moreover, each columnar spacer 26 making up the pair of the columnar spacers 26 is arranged in each of two unit pixels adjacent to each other in the row direction X, for example, in the G and B color unit pixels, while each columnar spacer 26 making up the pair of the columnar spacers 26 is arranged in every two unit pixels in the row direction X and in a staggered manner, for example, in two unit pixels G and B being adjacent to each other.

The LCD of the second embodiment is driven by a dot reverse driving method as in a case of the first embodiment. Therefore, since approximately a same signal charge as that in the first embodiment is written, a disturbance in a traverse electric field can be prevented. However, in the LCD of the second embodiment, since each columnar spacer 26 making up the pair of the columnar spacers 26 is arranged in each of the two unit pixels being adjacent to each other along the row direction X, as the precondition, a colored layer 16 into which the columnar spacer 26 is incorporated has to be formed so that its thickness is the same in any portion. By forming the pair of the columnar spacers 26 having configurations as described above, a liquid crystal panel can be held in a stable manner.

Thus, according to the second embodiment, the same effects as obtained in the first embodiment can be achieved.

Third Embodiment

FIG. 8 is a top view schematically showing configurations of an LCD according to a third embodiment of the present invention. Configurations in the third embodiment differ greatly from those in the first embodiment in that a liquid crystal 21 (FIG. 2) of the third embodiment is driven by a gate line reverse driving method. That is, in the LCD of the embodiment, as shown in FIG. 8, an arrangement of a pair of columnar spacers 26 is the same as in a case of the first embodiment, however, since the liquid crystal 21 is driven by the gate line reverse driving method, a signal charge being the same in polarity is written in every row made up of unit pixels. Therefore, each of the unit pixels making up the two unit pixels being adjacent to each other in a column direction Y in which each columnar spacer making up the pair of the columnar spacers 26 is disposed, bears a signal charge being opposite in polarity, which enables effects by the signal charge to be cancelled out as in the case of the first embodiment.

Thus, according to the third embodiment, the same effects as obtained in the first embodiment can be achieved.

Fourth Embodiment

FIG. 9 is a top view schematically showing configurations of an LCD according to a fourth embodiment of the present invention. Configurations in the fourth embodiment differ greatly from those in the first embodiment in that a column density is changed to be "1/3" and each columnar spacer 26 making up a pair of the columnar spacers 26 is disposed in each of two unit pixels being adjacent to each other. That is, in the LCD of the fourth embodiment, as shown in FIG. 9, the columnar spacer 26 is disposed so that a columnar area ratio CA is set within an optimum range used as a precondition described above and the column density becomes "1/3". Moreover, each columnar spacer 26 making up the pair of the columnar spacers 26 is arranged in each of two unit pixels adjacent to each other in a column direction Y, for example, in a G and G unit pixels, while the columnar spacers 26 are arranged in every two unit pixels in a direction X and in a staggered manner, for example, in the G and G unit pixels being adjacent to each other.

In the above configurations, though the number of the columnar spacers 26 is small, so long as the columnar area ratio CA is set within the range used as the precondition, there is no problem, that is, effects of a signal charge can be cancelled out.

Thus, according to the fourth embodiment, the same effects as obtained in the first embodiment can be achieved.

Fifth Embodiment

FIG. 10 is a top view schematically showing configurations of an LCD according to a fifth embodiment of the present invention. Configurations in the fifth embodiment differ greatly from those in the first embodiment in that a column density is changed to be "1/4" and each columnar spacer 26 making up a pair of the columnar spacers 26 is disposed in each of two unit pixels being adjacent to each other. That is, in the LCD of the fifth embodiment, as shown in FIG. 10, the columnar spacer 26 is disposed so that a columnar area ratio CA is set within an optimum range used as a precondition described above and the column density becomes "1/4". Moreover, each columnar spacer 26 making up the pair of the columnar spacers 26 is arranged in each of two unit pixels adjacent to each other in a column direction Y, for example, in a G and G unit pixels, while the columnar spacers 26 are arranged in every two unit pixels in a direction X and in a staggered manner, for example, in the G and G unit pixels being adjacent to each other.

In the above configurations, though the number of the columnar spacers 26 is smaller than that in a case of the fourth embodiment, so long as the columnar area ratio CA is set within the range used as the precondition, there is no problem, that is, effects of a signal charge can be cancelled out.

Thus, according to the fifth embodiment, the same effects as obtained in the first embodiment can be achieved.

Figure 11:
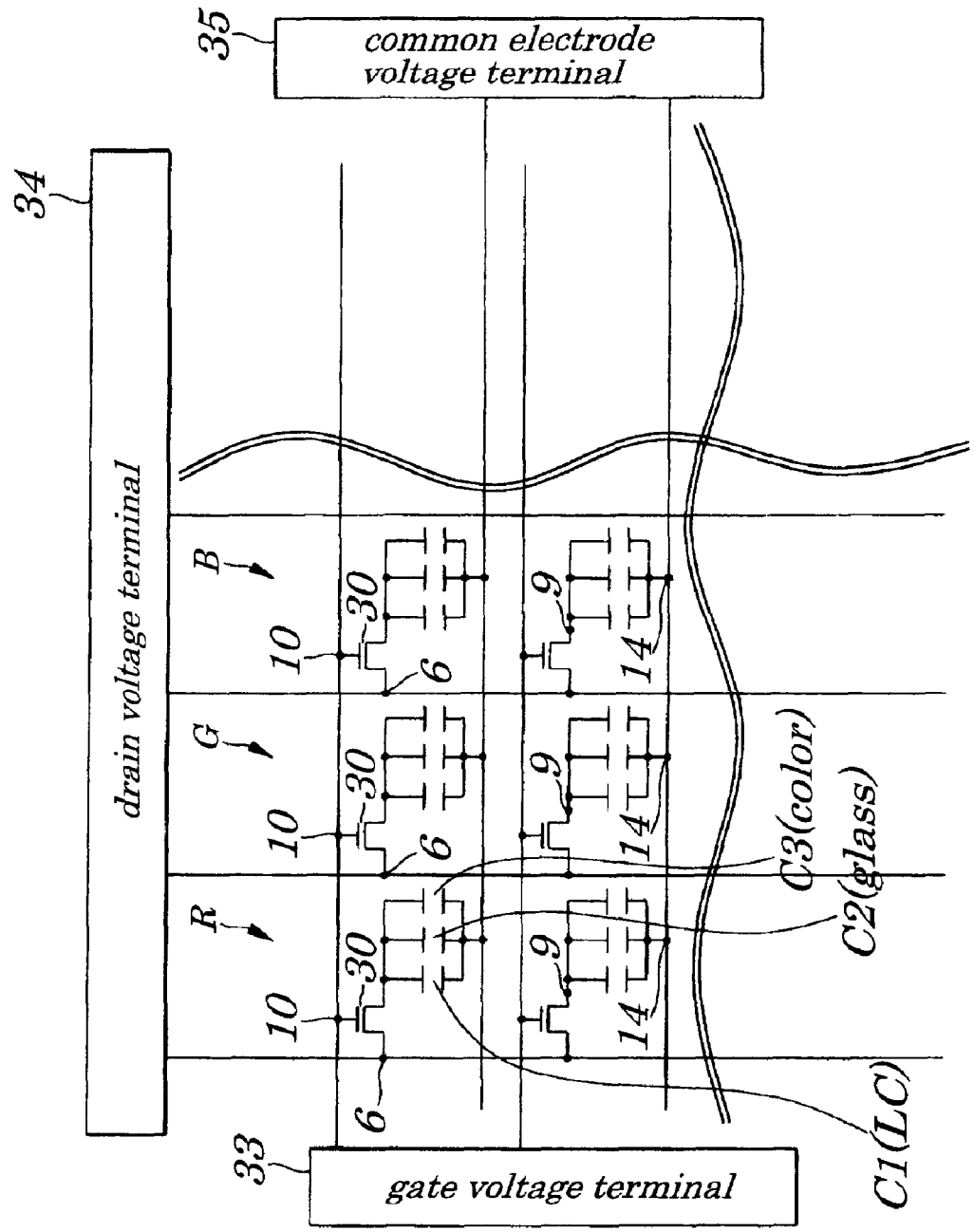
FIG. 11 is a diagram showing an equivalent circuit of a part of the LCD according to the present invention.
Figure 12:
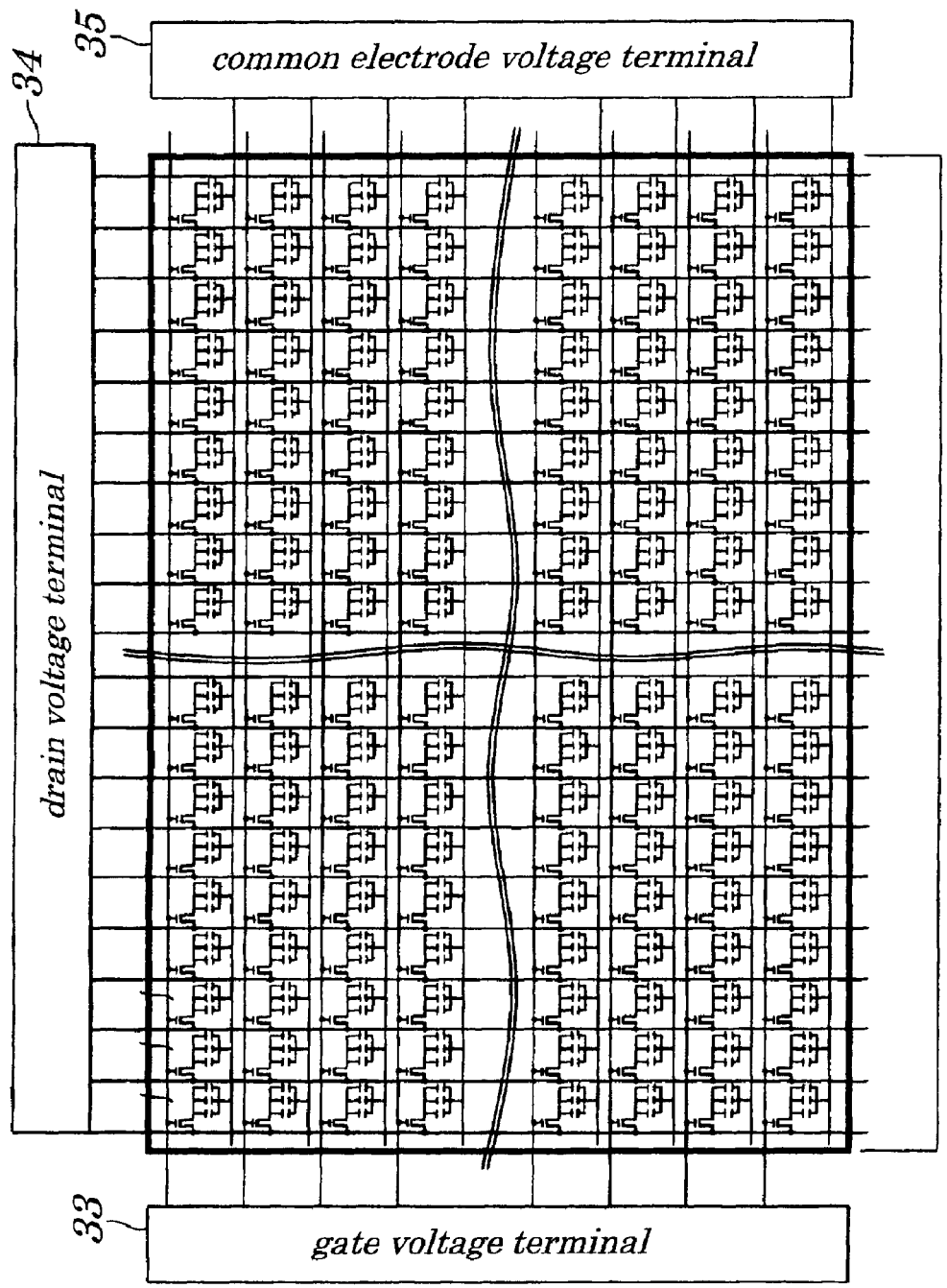
FIG. 12 is a diagram showing an equivalent circuit of an entire LCD which embodiment of the present invention.
Figure 15:
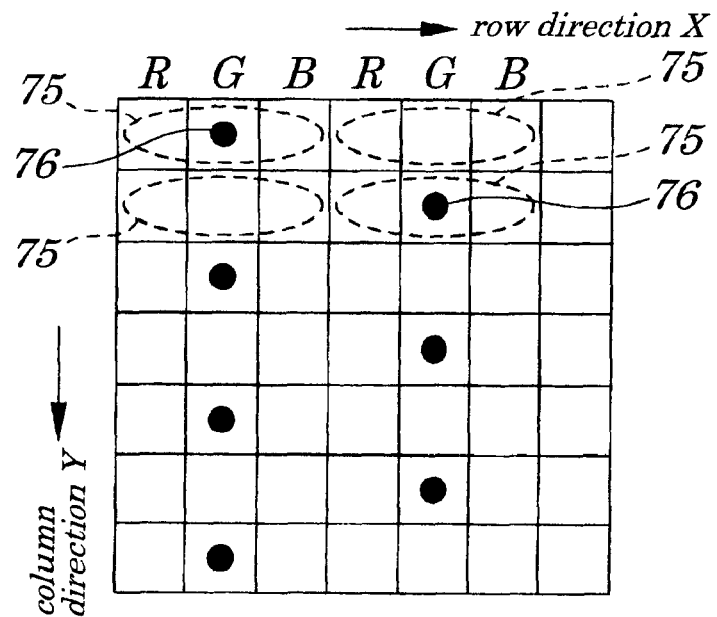
FIG. 15 is a top view of showing schematic configurations of the conventional LCD.
Figure 16:
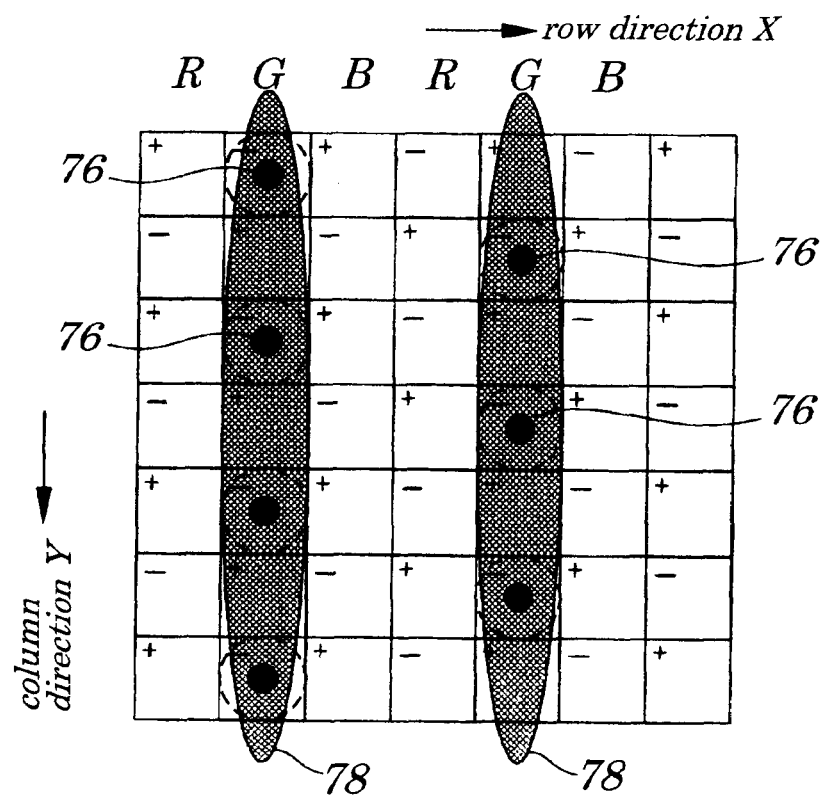
FIG. 16 is a diagram explaining a method for driving the conventional LCD.
Figure 17:
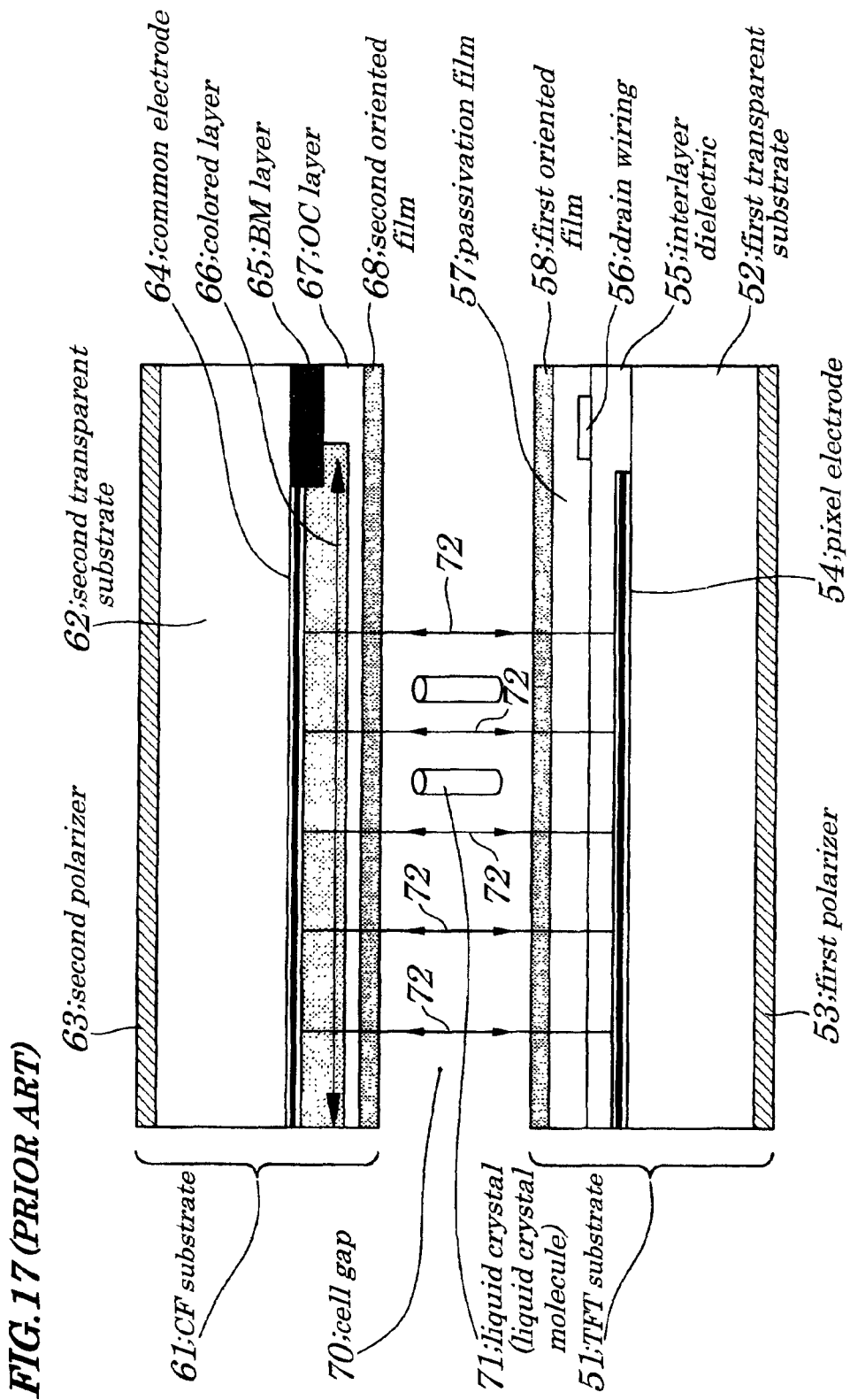
FIG. 17 is a cross-sectional view schematically showing configurations of a conventional TN-type liquid crystal display device.
Figure 18:
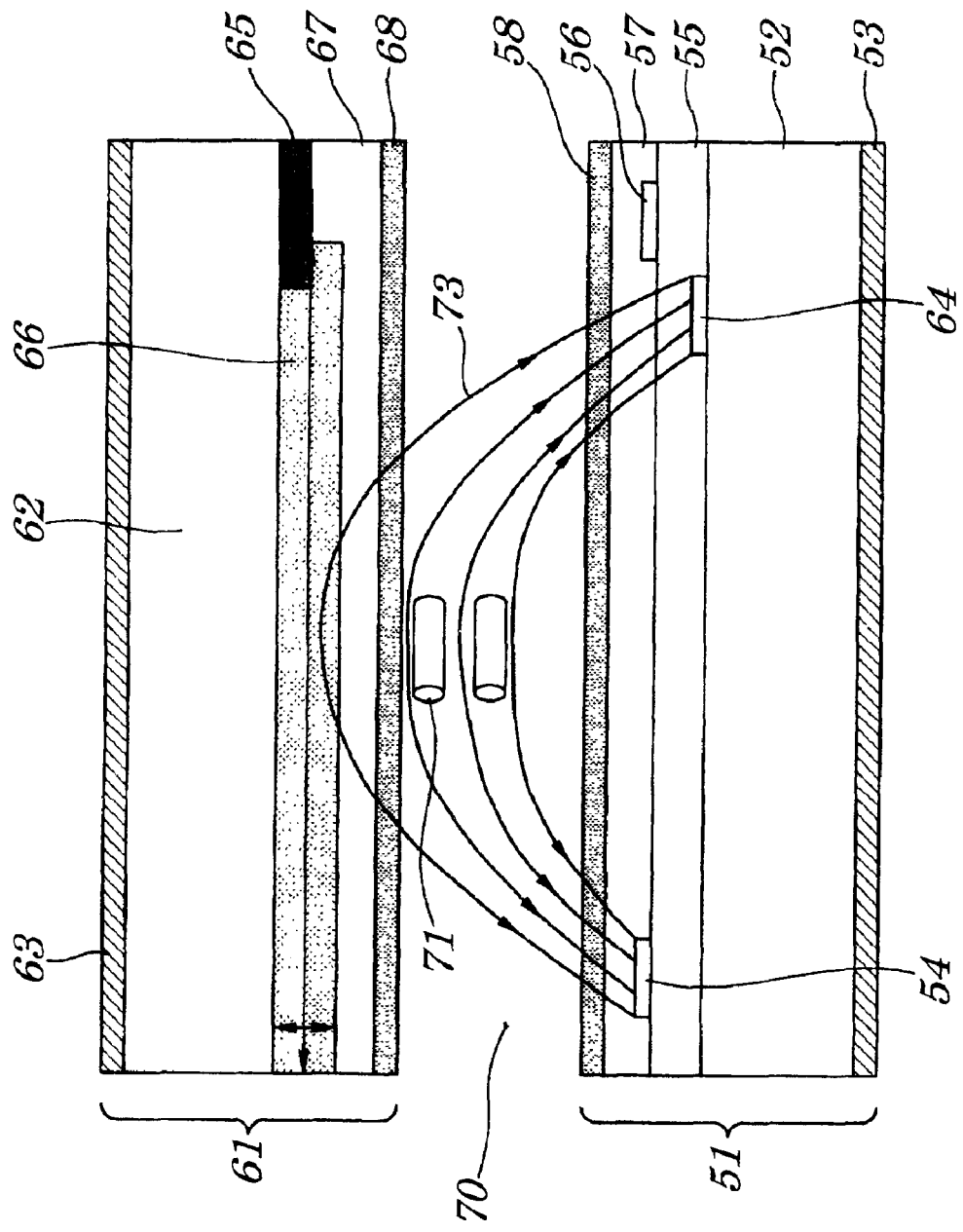
FIG. 18 is a cross-sectional view schematically showing configurations of a conventional IPS-type liquid crystal display device.

FIG. 11 is a diagram showing an equivalent circuit of a part of the LCD of the present invention. As shown in FIG. 11, to a gate electrode 10 of a TFT 30 making up each of unit pixels for R, G, and B colors is connected a gate voltage terminal 33 and to a drain electrode 6 of the TFT 30 is connected a drain voltage terminal 34. Moreover, to a common electrode 14 is connected a common electrode voltage terminal 35. Between a source electrode 9 of the TFT 30 and the common electrode 14 are connected a capacitor C1 for a liquid crystal 21 (FIG. 2), a capacitor C2 for the TFT substrate 1 made up of glass and a capacitor C3 for a colored layer 16. FIG. 12 is a diagram showing an equivalent circuit of an entire LCD of the present invention.

It is apparent that the present invention is not limited to the above embodiments but may be changed and modified without departing from the scope and spirit of the invention. For example, in the above embodiments, the pair of the columnar spacers 26 is disposed in the unit pixel "G", however, they may be arranged in other unit pixels such as an R or B unit pixel. A horizontal or longitudinal length of the columnar spacer 26 may be set arbitrarily so long as the columnar area ratio CA is set within the optimum range used as the precondition. Moreover, in the above embodiment, examples are shown in which the columnar spacers 26 are thinned out based on the optimum columnar area ratio CA. The arrangement in the unit pixel of the columnar spacers 26 employed when they are thinned out is not limited to the above example. The columnar spacers 26 may be arranged arbitrarily so long as they are disposed in unit pixels being adjacent to each other in the row direction X or column direction Y.

What is claimed is:

1. A liquid crystal display device comprising:
   a color filter substrate;
   a thin film transistor substrate;
   a plurality of liquid crystals between said color filter substrate and said thin film transistor substrate to form a matrix including a plurality of unit pixels arranged in a plurality of rows and a plurality of columns, the unit pixels of each column being of the same color, and with adjacent columns of unit pixels having unit pixels of different colors; and
   a plurality of columnar spacers interposed between said color filter substrate and said thin film transistor substrate, wherein:
      said columnar spacers are provided in a plurality of pairs, each pair of columnar spacers being in a pair of two unit pixels adjacent to each other in a row or a column of the matrix,
      each pair of columnar spacers is spaced from all other pairs of columnar spacers by at least two pixels of a row or a column, and
      the two unit pixels of each pair bear signal charges that are opposite in polarity.

2. The liquid crystal display device according to claim 1, further comprising a driver for driving liquid crystals in said liquid crystal display device by a gate line reverse driving method.

3. The liquid crystal display device according to claim 1, wherein said columnar spacers are disposed on a gate electrode of a thin film transistor formed on said thin film transistor substrate.

4. The liquid crystal display device according to claim 1, further comprising a pixel electrode and a common electrode formed on said thin film transistor substrate in a manner such that said pixel electrode and said common electrode are insulated from each other.

5. The liquid crystal display device according to claim 1, further comprising a driver for driving liquid crystals in said liquid crystal display device by a dot reverse driving method.

6. The liquid crystal display device according to claim 1, wherein the unit pixels of each row are arranged in sets of three unit pixels, with the columns providing a repetitive sequence of unit pixels of a first color, a second color, and a third color.

7. The liquid crystal display device according to claim 6, wherein said pairs of columnar spacers are provided in pairs of unit pixels adjacent to each other in columns of said matrix,
   each pair of columnar spacers is spaced from another pair of columnar spacers in its column by two pixels of such column,
   in each row only one set of three unit pixels from each adjacent set of three unit pixels has columnar spacers, and
   all columnar spacers are in unit pixels of the same color.

8. The liquid crystal display device according to claim 7, wherein within each row all unit pixels bear signal charges of the same polarity.

9. The liquid crystal display device according to claim 6, wherein said pairs of columnar spacers are provided in pairs of unit pixels adjacent to each other and within the same set of three unit pixels,
   each pair of columnar spacers is spaced from another pair of columnar spacers in its row by at least one set of three unit pixels of such row,
   within each column containing columnar spacers, each unit pixel containing a columnar spacer is spaced from another pixel containing a columnar spacer by at least one unit pixel, and
   unit pixels of one of the three colors have no columnar spacers.

10. The liquid crystal display device according to claim 9, wherein within each column containing columnar spacers, each unit pixel containing a columnar spacer is spaced from another unit pixel containing a columnar spacer by two unit pixels.

11. A liquid crystal display device comprising:
a color filter substrate having a colored layer formed thereon so that unit pixels are arranged in a matrix;
a thin film transistor substrate having thin film transistors formed thereon opposite to said colored layer;
a plurality of columnar spacers disposed between said color filter substrate and said thin film transistor substrate to form a cell gap therebetween; and
a plurality of liquid crystals hermetically sealed within the cell gap, wherein:
a columnar area ratio, being a ratio of a cross sectional area of said columnar spacer to an area of said unit pixel, is within a range of 0.05% to 0.15%,
said columnar spacers are provided in a plurality of pairs, with each pair of columnar spacers being disposed in a pair of two unit pixels arranged adjacent to each other in a row direction within a row of the matrix or in a column direction within a column of the matrix, and
each pair of columnar spacers is spaced from all other pairs of columnar spacers by at least two pixels of a row or a column.

12. The liquid crystal display device according to claim 11, wherein said columnar spacers are arranged in the column direction, and said unit pixels are driven by a dot reverse driving method.

13. The liquid crystal display device according to claim 11, wherein said columnar spacers are arranged in the row direction, and said unit pixels are driven by a gate line reverse driving method.

14. The liquid crystal display device according to claim 11, wherein the unit pixels of each row of the matrix are arranged in sets of three unit pixels, with the columns of the matrix providing a repetitive sequence of unit pixels of a first color, a second color, and a third color.

15. The liquid crystal display device according to claim 11, wherein said pairs of columnar spacers are provided in pairs of unit pixels adjacent to each other in columns of said matrix,
each pair of columnar spacers is spaced from another pair of columnar spacers in its column by two pixels of such column,
in each row only one set of three unit pixels from each adjacent set of three unit pixels has columnar spacers, and
all columnar spacers are in unit pixels of the same color.

16. The liquid crystal display device according to claim 15, wherein within each row all unit pixels bear signal charges of the same polarity.

17. The liquid crystal display device according to claim 14, wherein said pairs of columnar spacers are provided in pairs of unit pixels adjacent to each other and within the same set of three unit pixels,
each pair of columnar spacers is spaced from another pair of columnar spacers in its row by at least one set of three unit pixels of such row,
within each column containing columnar spacers, each unit pixel containing a columnar spacer is spaced for another pixel containing a columnar spacer by at least one unit pixel, and
unit pixels of one of the three colors have no columnar spacers.

18. The liquid crystal display device according to claim 17, wherein within each column containing columnar spacers, each unit pixel containing a columnar spacer is spaced from another unit pixel containing a columnar spacer by two unit pixels.

19. The liquid crystal display device according to claim 11, wherein said columnar spacers are disposed on a gate electrode of said thin film transistors.

20. The liquid crystal display device according to claim 11, further comprising a pixel electrode and a common electrode formed on said thin film transistor substrate in a manner such that said pixel electrode and said common electrode are insulated from each other.

* * * * *